(12) United States Patent
Carlson

(10) Patent No.: US 11,412,894 B2
(45) Date of Patent: Aug. 16, 2022

(54) ELECTRIC HAND MIXER

(71) Applicant: Hamilton Beach Brands, Inc., Glen Allen, VA (US)

(72) Inventor: Drew Carlson, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 561 days.

(21) Appl. No.: 16/460,146

(22) Filed: Jul. 2, 2019

(65) Prior Publication Data

US 2021/0000299 A1    Jan. 7, 2021

(51) Int. Cl.
*A47J 43/00* (2006.01)
*A47J 43/08* (2006.01)
*A47J 43/044* (2006.01)

(52) U.S. Cl.
CPC ........... *A47J 43/082* (2013.01); *A47J 43/044* (2013.01); *A47J 2043/04427* (2013.01)

(58) Field of Classification Search
CPC .................... A47J 43/082; A47J 43/044; A47J 2043/04427
See application file for complete search history.

(56) References Cited

U.S. PATENT DOCUMENTS

| | | | |
|---|---|---|---|
| 4,357,519 A | 11/1982 | Bain, Jr. | |
| 5,390,433 A | 2/1995 | Brady | |
| 5,522,659 A * | 6/1996 | Penaranda | A47J 43/0705 310/71 |
| 6,942,080 B2 | 9/2005 | Chi | |
| 9,190,822 B2 | 11/2015 | McCormick et al. | |
| 9,534,341 B2 | 1/2017 | Esteve | |

* cited by examiner

*Primary Examiner* — Anshu Bhatia
(74) *Attorney, Agent, or Firm* — Alexander D. Raring

(57) ABSTRACT

An electric hand mixer comprises a housing having at least a bottom surface and a rear heel surface, a motor within the housing, one or more holes defined in the bottom surface for receiving a respective rotatable beater, and a power cord extending outward from the housing. A recess is defined in the housing. A first opening to the recess is defined in the bottom surface. A second opening to the recess is defined in the rear heel surface. The first and second openings are continuous with each other. The power cord extends outward from within the recess.

7 Claims, 9 Drawing Sheets

ELECTRIC HAND MIXER

BACKGROUND OF THE DISCLOSURE

The present disclosure relates generally to small appliances, and more particularly to electric hand mixers.

Electric hand mixers are small, handheld kitchen appliances used to mix foodstuffs in a bowl using (typically) two selectively rotatable beaters. The beaters are selectively insertable into and removable from corresponding holes in a bottom surface of the device. Electric hand mixers typically have an integral handle on top of the device. Electric hand mixers typically have a flat rear surface, termed a "heel." When a user needs to set down an electric hand mixer with the beaters still inserted, the user places the electric hand mixer down onto its heel so that the beaters remain elevated and do not contact any surfaces (such as a countertop). It is desirable that the beaters do not contact any surfaces, as the surface may be dirtied by the foodstuff on the beaters and/or the foodstuff on the beaters may be contaminated by the surface and the contamination may end up back in the bowl if mixing resumes.

Electric hand mixers typically have a power cord projecting outward from the top, bottom, or side of the device. The heel is cord free as a cord projecting from the heel would prevent the electric hand mixer from being set down on the heel. A power cord projecting from the top of the electric hand mixer often contacts a user's hand, wrist, or arm, and such contact may interfere with the user's ability to freely manipulate and move the electric hand mixer as desired. A power cord projecting from the bottom of the electric hand mixer often contacts the bowl containing the foodstuff, and such contact may also interfere with the user's ability to freely manipulate and move the electric hand mixer around the bowl as desired. A power cord projecting from the side of the electric hand mixer may undesirably contact the user's hand, wrist, or arm, or otherwise interfere with operation of the appliance depending on which hand the user uses to hold the electric hand mixer.

It has heretofore not been discovered how to create an electric hand mixer with a power cord that does not tend to undesirably contact the user or the bowl or otherwise interfere with the operation of the mixer, regardless of which hand is used to hold the device. The electric hand mixer of the following disclosure overcomes at least one of the above-described disadvantages of conventional electric hand mixers.

BRIEF SUMMARY OF THE DISCLOSURE

An electric hand mixer is disclosed herein. In one embodiment of the subject device, an electric hand mixer comprises a housing having at least a bottom surface and a rear heel surface, a motor within the housing, one or more holes defined in the bottom surface for receiving a respective rotatable beater, and a power cord extending outward from the housing. A recess is defined in the housing. A first opening to the recess is defined in the rear heel surface. A second opening to the recess is defined in the bottom surface. The first and second openings are continuous with each other. The power cord extends outward from within the recess.

The housing may comprise an angled wall spanning from a floor of the recess to the rear heel surface, such that the power cord extends outward from the angled wall. The angled wall may have an angle relative to an adjoining edge of the rear heel surface that is greater than 90 degrees, and the angled wall may have an angle relative to an adjoining edge of the floor of the recess that is greater than 90 degrees.

In alternative embodiments of the present disclosure, an electric hand mixer comprises a housing having at least a bottom surface and a rear heel surface, a motor within the housing, one or more holes defined in the bottom surface for receiving a respective rotatable beater, and a power cord extending outward from the housing. A recess is defined in the housing. The recess extends across a portion of the rear heel surface and across a portion of the bottom surface. The power cord extends outward from within the recess.

In other alternative embodiments of the present disclosure, a method of affixing a power cord to an electric hand mixer is provided. The hand mixer comprises a housing having at least a bottom surface and a rear heel surface, a motor within the housing, one or more holes defined in the bottom surface for receiving a respective rotatable beater, and a power cord extending outward from the housing. The method comprises defining a recess in the housing and positioning the power cord such that the power cord extends outward from within the recess. The recess has a first opening defined in the rear heel surface and a second opening defined in the bottom surface. The first and second openings are continuous with each other.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
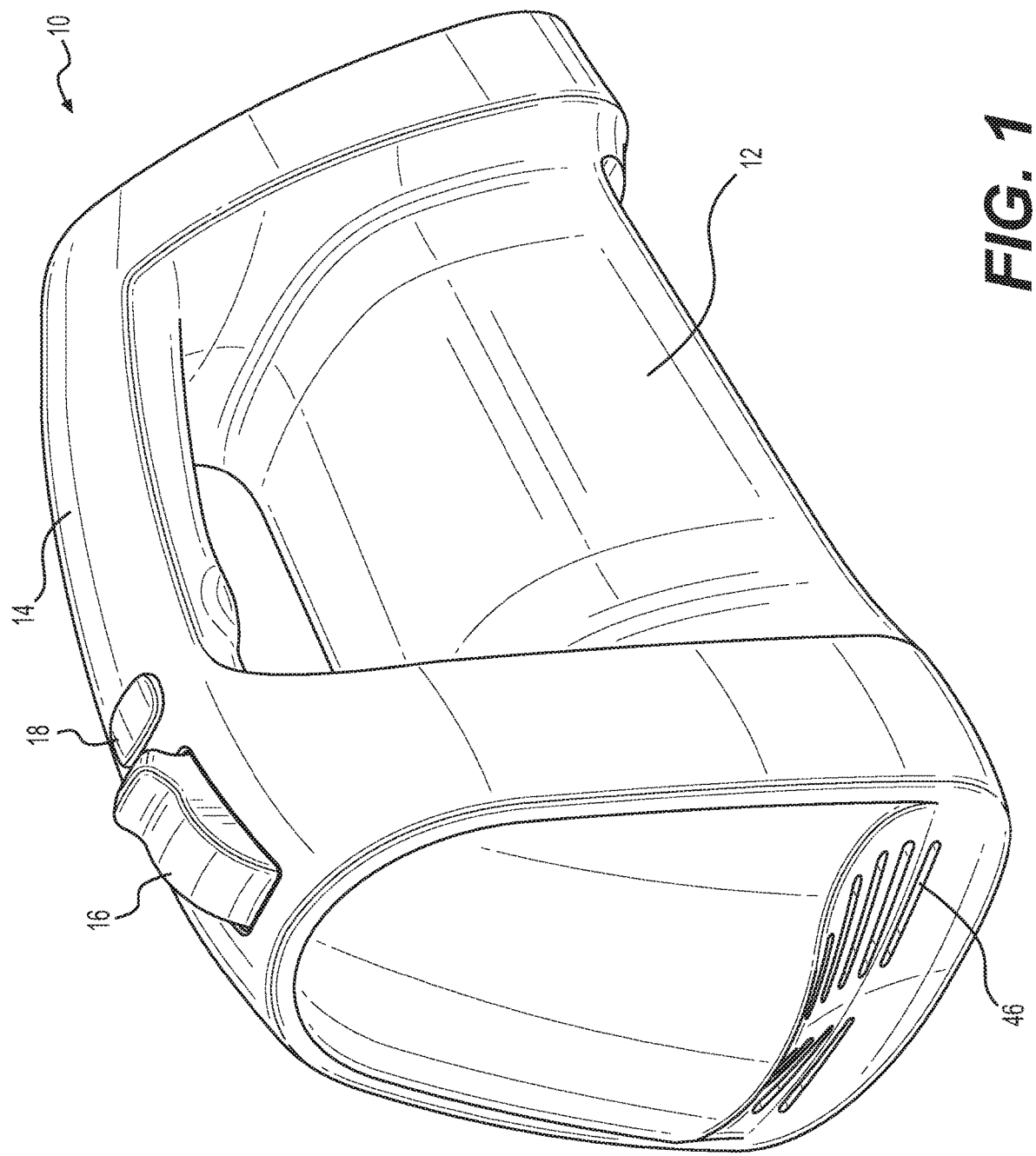
FIG. 1 is a perspective view of an electric hand mixer from the top and front, according to one embodiment of the present disclosure.
Figure 2:
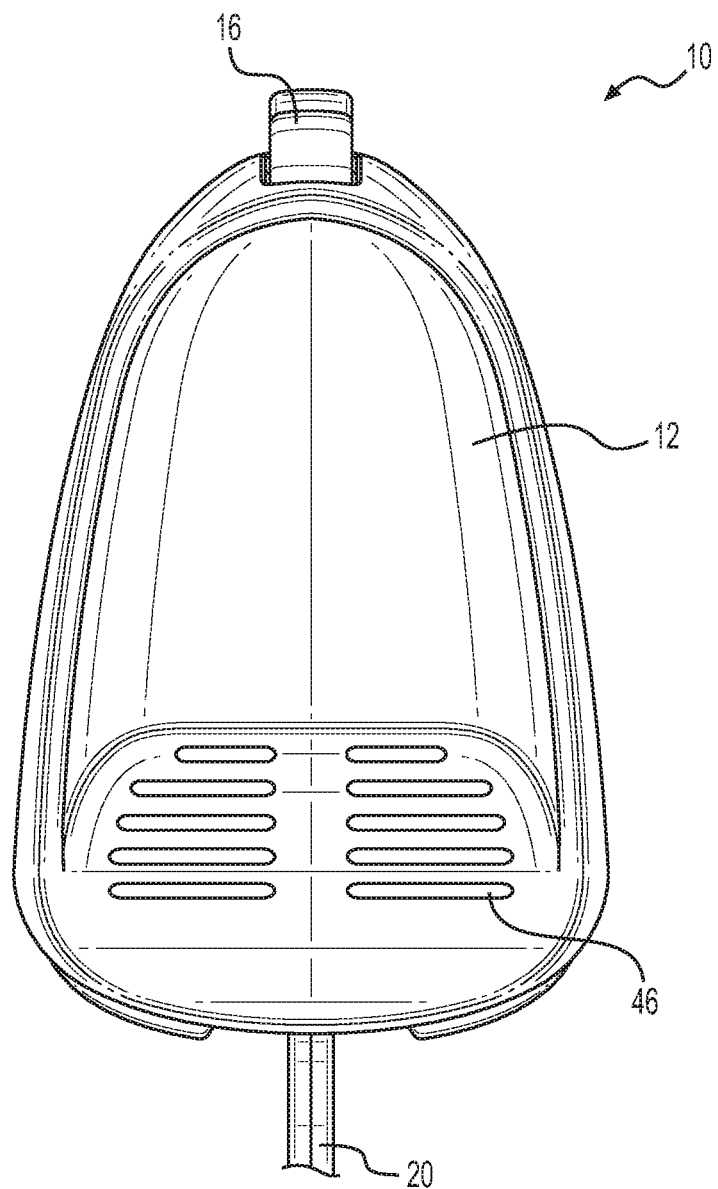
FIG. 2 is a front view of the electric hand mixer of FIG. 1.
Figure 3:
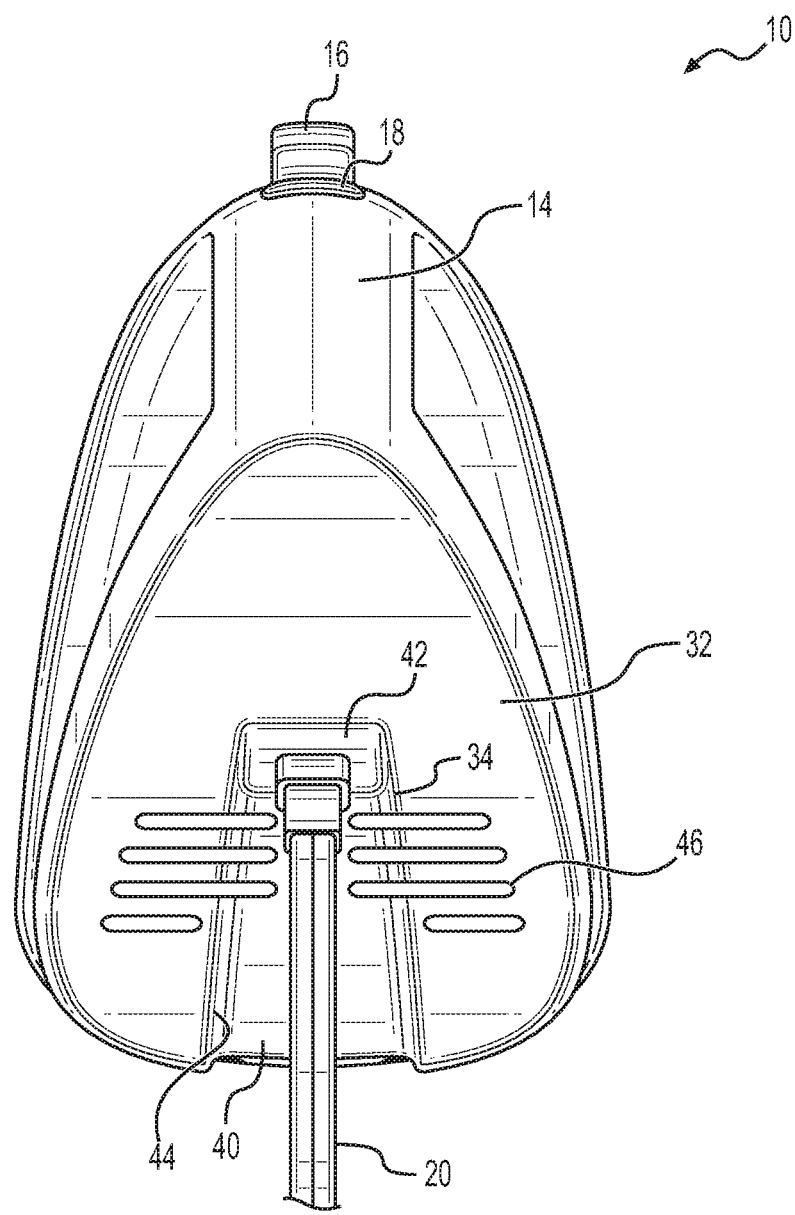
FIG. 3 is a rear view of the electric hand mixer of FIG. 1.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-8 illustrate an electric hand mixer in accordance with a preferred embodiment of the present disclosure. The electric hand mixer 10 comprises a housing 12 having at least a bottom surface 30 and a rear heel surface 32. The rear heel surface 32 is flat (except for the recess 36 described further below) to enable a user place the electric hand mixer 10 down onto its heel when not in use so that the beaters remain elevated and do not contact the surface upon which the electric hand mixer 10 is placed. A plurality of air intake and/or exhaust vents 46 may be defined in the housing to enable airflow through the housing for cooling purposes.

An integral handle 14 enables a user to readily grasp and hold the device during use. One or more (typically two) holes 22 are defined in the bottom surface 30 for receiving a respective rotatable beater 58. Recessed within each hole 22 is a rotatable socket 56 which securely receives a proximal end of a respective beater 58. The socket(s) 56 are selectively rotated to rotate the beater(s), as described further below. A pushbutton 18 or the like enables a user to eject the beater(s).

A control switch 16, typically located at the front end of the handle 14, enables a user to turn the device on and off and also typically to set a rotational speed of the beater(s) (e.g., low, medium, high). A power cord 20 extends outward from the housing 12.

Figure 8:
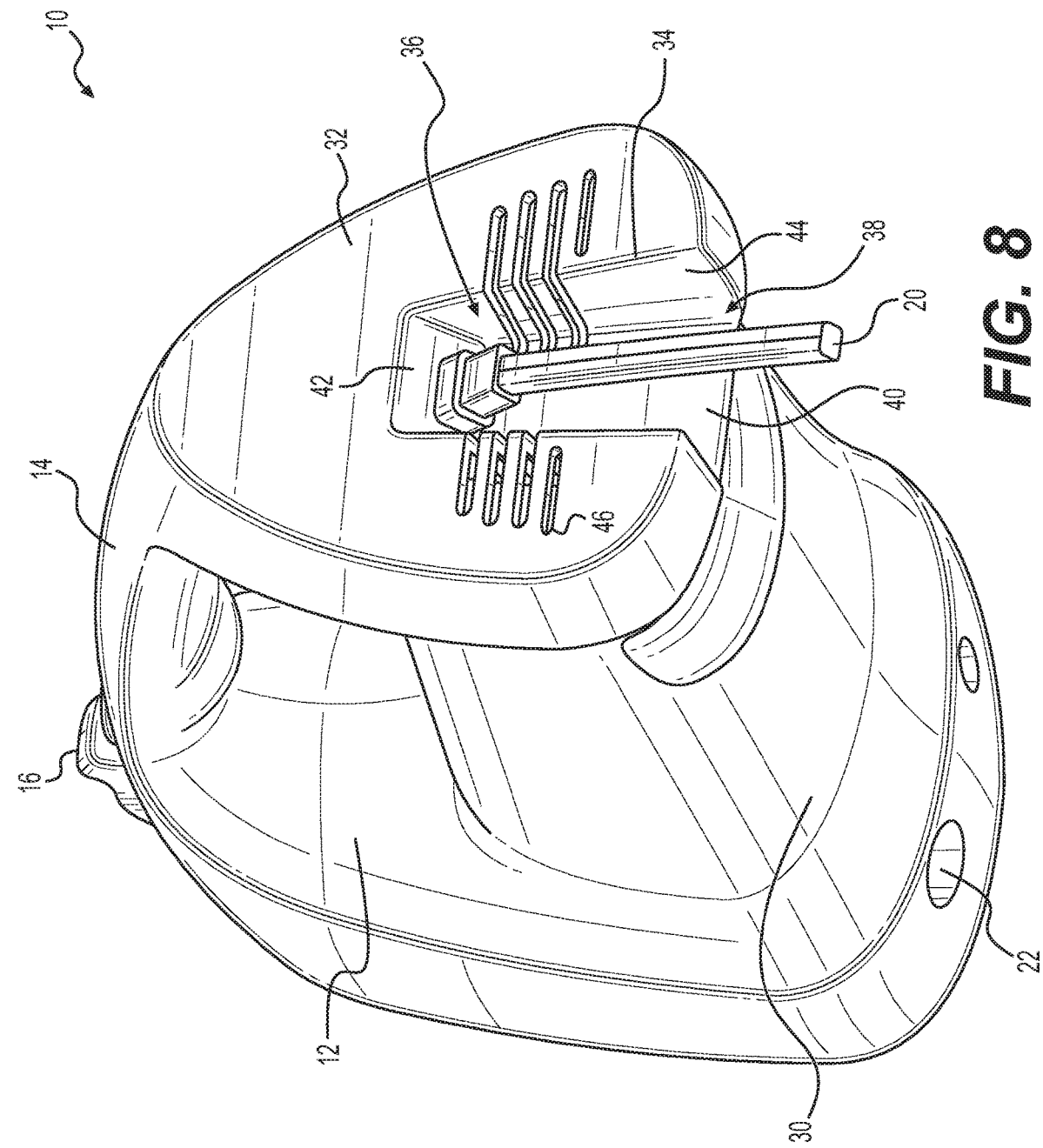
FIG. 8 is a perspective view of the electric hand mixer of FIG. 1, from the bottom and rear.
Figure 9:
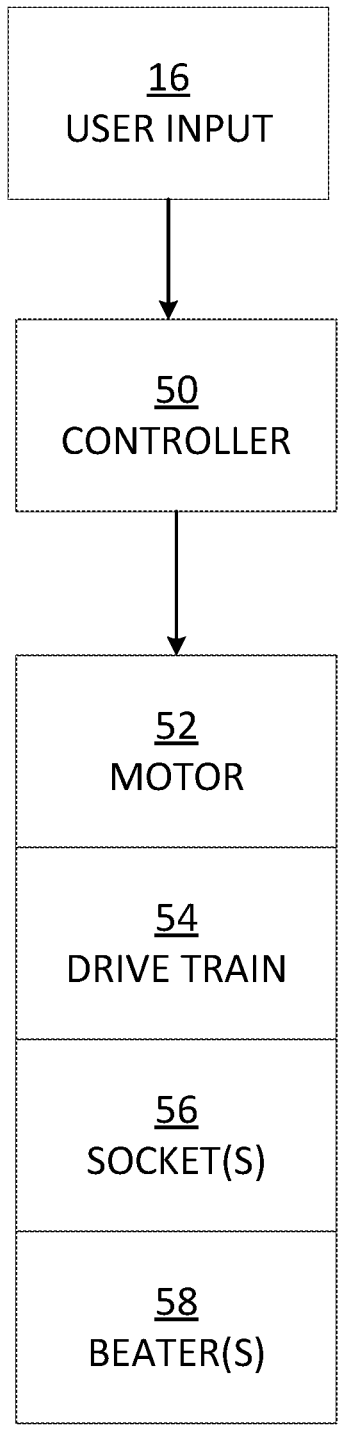
FIG. 9 is a block diagram of the drive train and control system of the electric can opener of FIG. 1.

The control system and drive train of the electric hand mixer 10 is contained within the housing 12 and is illustrated schematically in FIG. 8. A controller 50 receives an on/off/speed signal from a user input (such as switch 16). The controller 50 may comprise a microprocessor, dedicated or general purpose circuitry (such as an application-specific integrated circuit or a field-programmable gate array), a suitably programmed computing device, or any other suitable means for controlling the operation of the electric hand mixer 10. In response to an on/speed signal from the user input, the controller 50 actuates a motor 52 and causes the motor 52 to rotate at a speed corresponding to the desired speed of the beater(s) (taking into consideration any gear ratio). The motor 52 is engaged with a drive train 54. Such a drive train 54 may be, for example, a plurality of gears that translate the rotation of the motor 52 into rotation of the socket(s) 56 and thereby into rotation of the beater(s) 58.

A recess 34 is defined in the housing. The recess 34 is open to two different sides of the housing 12. A first opening 36 to the recess 34 is defined in the rear heel surface 32, and a second opening 38 to the recess 34 is defined in the bottom surface 30. The first and second openings are continuous with each other. Namely, they are conjoined to create an open ended channel in the rear of the housing. The recess 34 has a floor 40, opposing side walls 44, and an end wall 42. The end wall 42 and the opposing side walls 44 span from the floor 40 to the rear heel surface 32.

Figure 4:
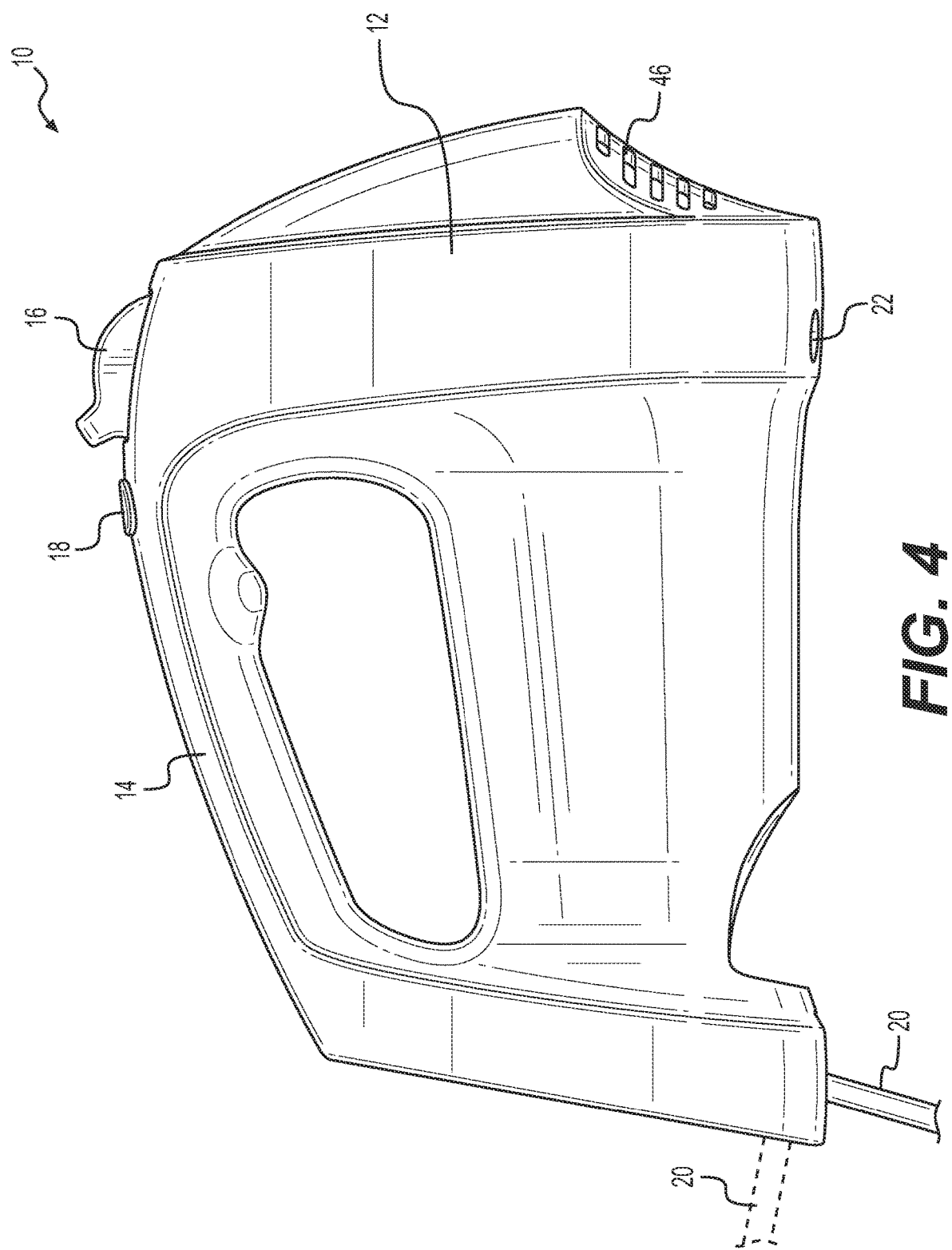
FIG. 4 is a right side view of the electric hand mixer of FIG. 1.
Figure 5:
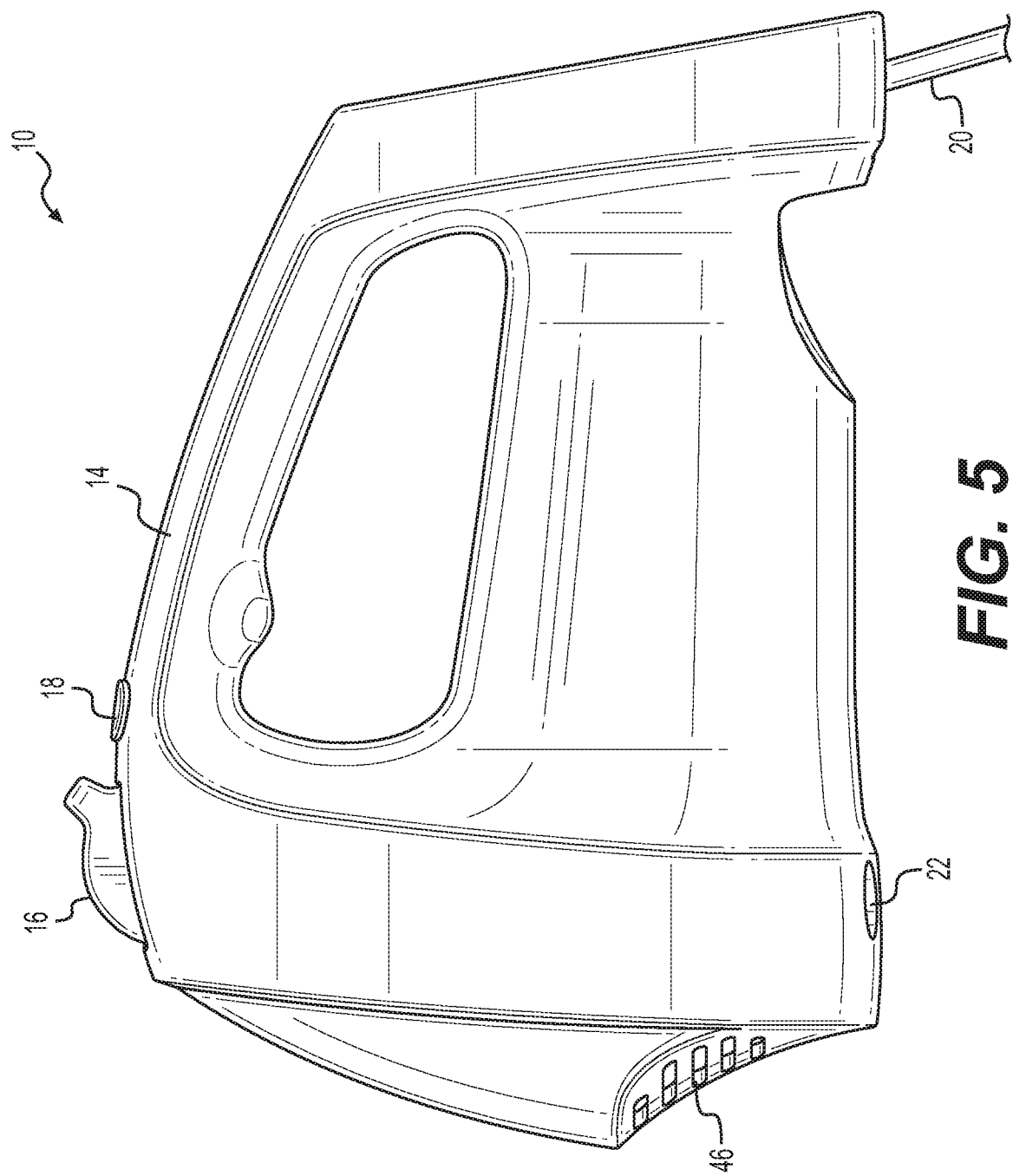
FIG. 5 is a left side view of the electric hand mixer of FIG. 1.
Figure 6:
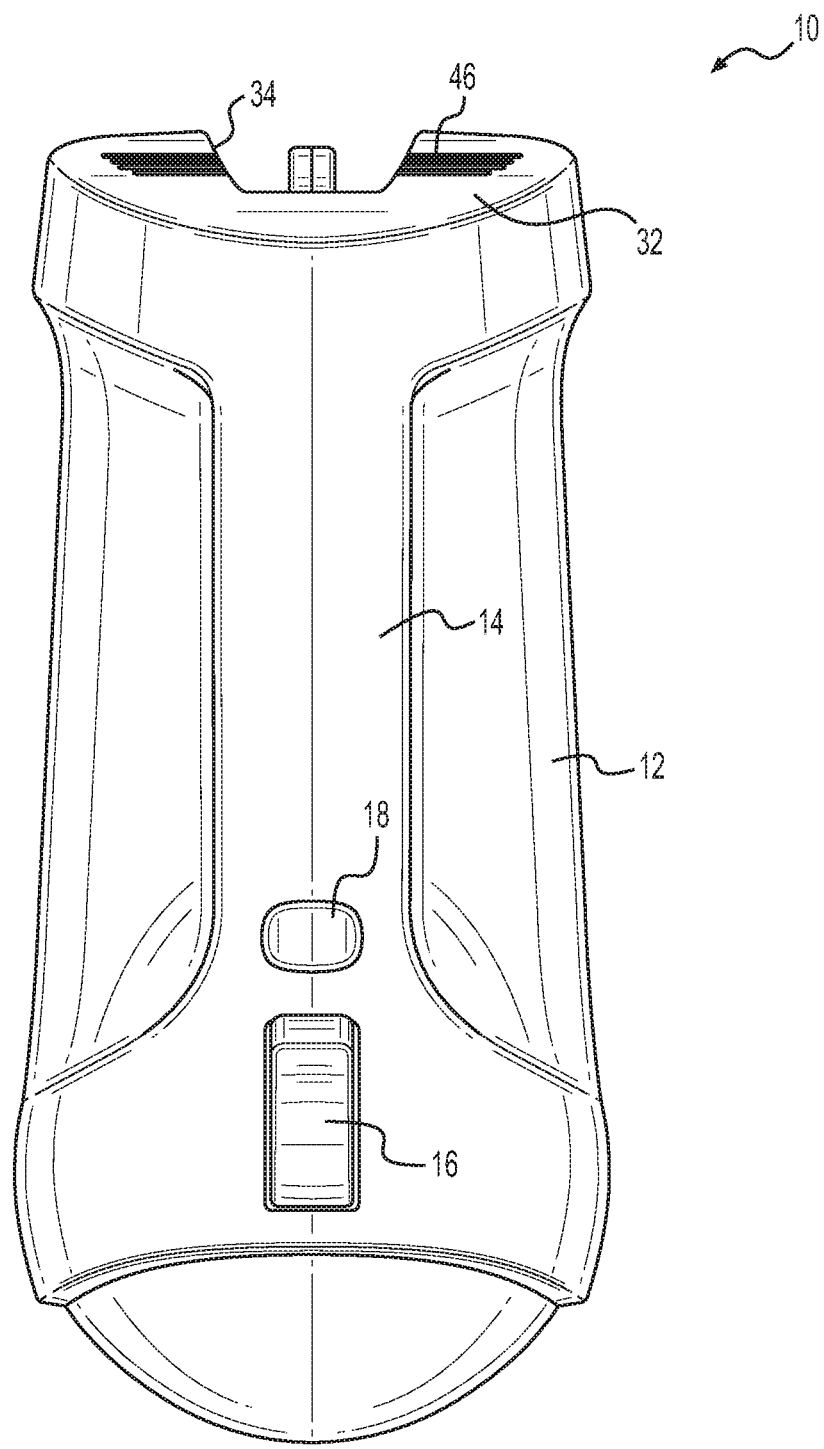
FIG. 6 is a top view of the electric hand mixer of FIG. 1.
Figure 7:
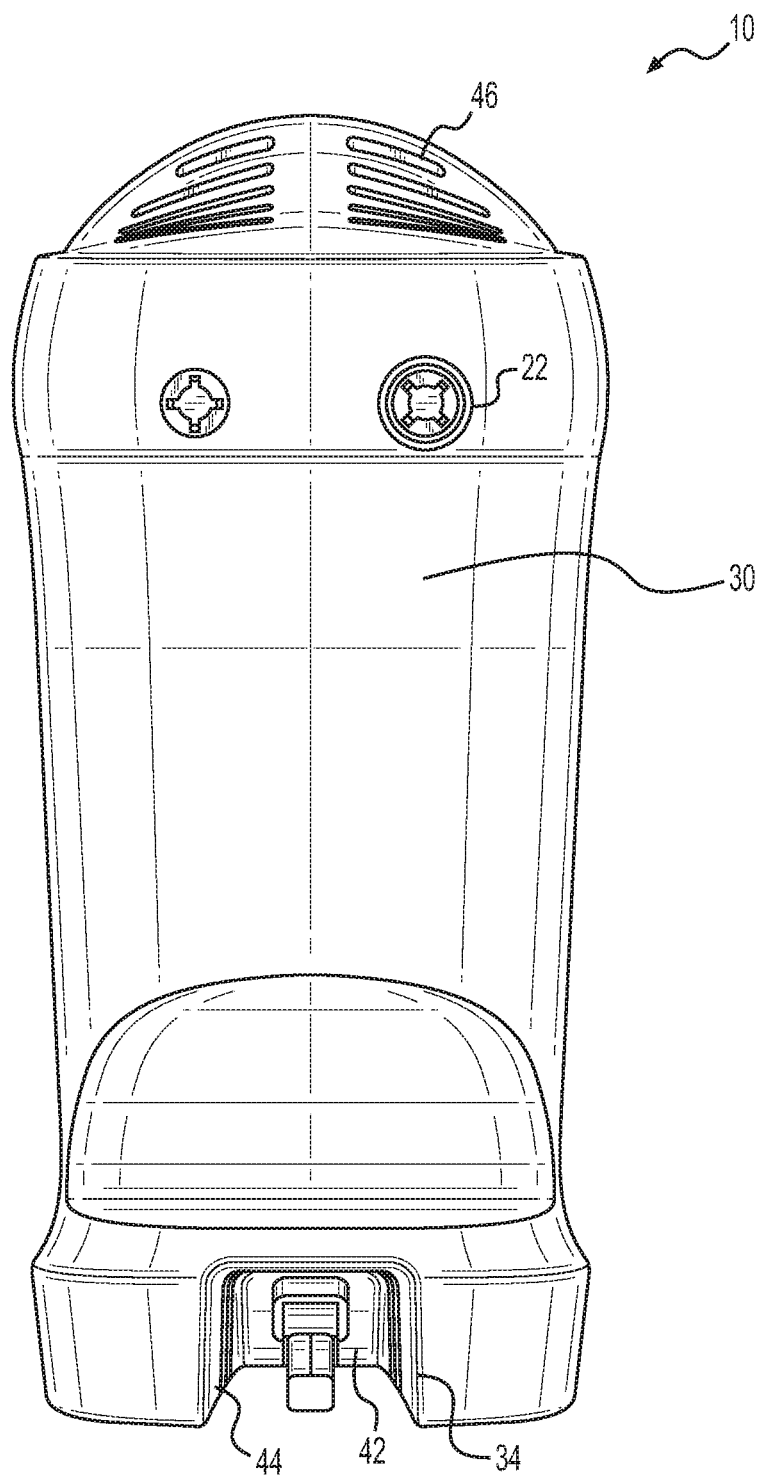
FIG. 7 is a bottom view of the electric hand mixer of FIG. 1.

The power cord 20 extends outward from within the recess 34. Because the recess 34 has openings to both the rear heel surface 32 and to the bottom surface 30 and because the two openings are continuous with each other, the power cord 20 is readily repositionable (either through purposeful user action or through movement of the device itself) to extend more rearward and project out of the first opening 36 or to extend more downward and project out of the second opening 38. These two different positions of the power cord 20 are illustrated in FIG. 4, in which the solid line illustrates the power cord 20 projecting out of the second opening 38 and the dashed line illustrates the power cord 20 projecting out of the first opening 36.

The rearward projection out of the first opening 36 may be preferred during use of the electric hand mixer 10 to enable the desired movement of the device. The downward projection out of the second opening 38 enables the electric hand mixer 10 to be set down on the rear heel surface 32 without the power cord 20 getting in the way.

In the illustrated embodiment of the disclosure, the power cord 20 extends outward from the end wall 42 of the recess 34. The rear wall 42 may be angled as illustrated. The angle of the end wall 42 relative to an adjoining edge of the rear heel surface 32 is greater than 90 degrees, and the angle of the rear wall 42 relative to an adjoining edge of the floor 40 of the recess is greater than 90 degrees. Thus, the angle of the rear wall 42 causes the power cord 20 to have a static or default orientation that projects partially rearward toward the first opening 36 and partially downward toward the second opening 38. This partial rearward/partial downward projection of the power cord 20 more readily enables the power cord 20 to move more rearward or more downward as needed (as opposed to having the power cord project perpendicularly from the floor of the recess or having the power cord project from an end wall that is perpendicular to the floor of the recess).

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. An electric hand mixer comprising:
    a housing having at least a bottom surface, the bottom surface comprising at least one hole, the housing further including a flat, rear heel surface, the flat, rear heel surface selectively operable to support the electric hand mixer upon a support surface;
    a recess being defined in the housing, a first opening to the recess being defined in the flat, rear heel surface, a second opening to the recess being defined in the bottom surface, the first and second openings being continuous with each other;
    a motor within the housing;
    at least one beater selectively insertable into and removable from the at least one hole of the bottom surface, the at least one beater being elevated and not in contact with the support surface when the electric hand mixer is selectively supported by the flat, rear heel surface upon the support surface; and
    a power cord extending outward from the housing, the power cord extending outward from within the recess.

2. The hand mixer of claim 1, wherein the housing comprises an angled wall spanning from a floor of the recess to the rear heel surface; and
    wherein the power cord extends outward from the angled wall.

3. The hand mixer of claim 2, wherein the angled wall has an angle relative to an adjoining edge of the rear heel surface that is greater than 90 degrees; and
    wherein the angled wall has an angle relative to an adjoining edge of the floor of the recess that is greater than 90 degrees.

4. An electric hand mixer comprising:
    a housing having at least a bottom surface and a rear heel surface, a recess being defined in the housing, the recess extending across a portion of the rear heel surface and across a portion of the bottom surface, the housing further comprising an angled wall spanning from a floor of the recess to the rear heel surface, the angled wall having an angle relative to an adjoining edge of the rear heel surface that is greater than 90 degrees and an angle relative to an adjoining edge of the floor of the recess that is greater than 90 degrees;

a motor within the housing;

one or more holes defined in the bottom surface for receiving a respective rotatable beater; and a power cord extending outward from the housing, the power cord extending outward from within the recess from the angled wall.

5. A method of affixing a power cord to an electric hand mixer, the hand mixer comprising a housing having at least a bottom surface and a flat, rear heel surface, a motor within the housing, one or more holes defined in the bottom surface for receiving a respective rotatable beater, and a power cord extending outward from the housing, the method comprising:

defining a recess in the housing, the recess having a first opening defined in the flat, rear heel surface and a second opening defined in the bottom surface, the first and second openings being continuous with each other;

providing an angled wall spanning from a floor of the recess to the rear heel surface;

selectively inserting into and removing from the one or more holes of the bottom surface at least one beater;

selectively positioning the hand mixer on a support surface via the flat, rear hear surface; and affixing the power cord such that the power cord extends outward from the angled wall and from within the recess.

6. The method of claim 5, wherein the angled wall has an angle relative to an adjoining edge of the rear heel surface that is greater than 90 degrees; and wherein the angled wall has an angle relative to an adjoining edge of the floor of the recess that is greater than 90 degrees.

7. An electric hand mixer comprising:

a housing having at least a bottom surface and a rear heel surface, a recess being defined in the housing, the recess extending across a portion of the rear heel surface and across a portion of the bottom surface;

a motor within the housing;

a beater;

one or more holes defined in the bottom surface for receiving the beater;

a power cord extending outward from the housing, the power cord extending outward from within the recess; and a plurality of vents comprising apertures in the housing, at least one of the plurality of vents extending along the rear heel surface and into the recess.

* * * * *